April 23, 1963 J. P. GITS 3,086,250

METHODS OF MAKING A MOLDED INDICIA-BEARING ARTICLE

Filed June 21, 1957 7 Sheets-Sheet 1

INVENTOR
JULES P. GITS
BY Roy Eilers ATT'Y.

INVENTOR
JULES P. GITS
BY Roy Eilers ATT'Y.

METHODS OF MAKING A MOLDED INDICIA-BEARING ARTICLE

Filed June 21, 1957 7 Sheets-Sheet 3

INVENTOR
JULES P. GITS
BY Roy Eilers ATT'Y.

April 23, 1963 J. P. GITS 3,086,250

METHODS OF MAKING A MOLDED INDICIA-BEARING ARTICLE

Filed June 21, 1957 7 Sheets-Sheet 4

INVENTOR
JULES P. GITS
BY Roy Eilers ATT'Y.

INVENTOR
JULES P. GITS
BY Roy Ebers ATT'Y.

April 23, 1963   J. P. GITS   3,086,250
METHODS OF MAKING A MOLDED INDICIA-BEARING ARTICLE
Filed June 21, 1957   7 Sheets-Sheet 5

INVENTOR
JULES P. GITS
BY Rey Eilers ATT'Y

METHODS OF MAKING A MOLDED INDICIA-BEARING ARTICLE

Filed June 21, 1957 7 Sheets-Sheet 6

INVENTOR
JULES P. GITS
BY Roy Eilers ATT'Y.

METHODS OF MAKING A MOLDED INDICIA-BEARING ARTICLE

Filed June 21, 1957

INVENTOR
JULES P. GITS

BY Roy Eilers ATTY.

United States Patent Office 3,086,250

Patented Apr. 23, 1963

1

3,086,250

METHODS OF MAKING A MOLDED INDICIA-BEARING ARTICLE

Jules P. Gits, River Forest, Ill., assignor of one-half to Joseph A. Gits, River Forest, Ill.

Filed June 21, 1957, Ser. No. 667,077
7 Claims. (Cl. 18—59)

This invention relates to improvements in methods of making a molded indicia-bearing article.

It is frequently desirable to provide molded articles that have differently colored areas to define indicia; and in recognition of this fact, a number of such articles have been proposed. Those articles usually have light-colored areas and dark-colored areas. In some instances, those articles are mounted in front of sources of illumination; and light from those sources is intended to pass through the light-colored areas of those articles. To be effective and attractive, those articles should be formed so the light-colored areas thereof are free of shadows. The light-colored areas are frequently given the configuration of numerals or letters; and where those areas are "open" in nature, it is relatively easy to make those areas shadow-free. Thus, where the light-colored areas have the configuration of the numerals 1, 2, 3, 5 or 7, or have the configuration of the letters C, E, F, G, H, I, J, K, L, M, N, S, T, U, V, W, X, Y or Z, it is relatively easy to make those areas shadow-free. However, where the light-colored areas are given the configuration of numerals or letters that are "closed" in nature, it is not easy to make those areas shadow-free. Thus, where the light-colored areas have the configuration of the numerals 4, 6, 8, 9 or 0, or have the configuration of the letters A, B, D, O, P, Q or R, it is not easy to make those areas shadow-free.

In molding indicia-bearing articles it is customary to form a "first shot" and then to apply a "second shot" to that "first shot." The "first shot" can be provided with recesses that define the indicia, or it can be made so the indicia are in half-relief. Where the indicia are defined by recesses in a dark-colored "first shot," the wholly enclosed areas or "islands" of the indicia must be supported and held by struts, and those struts will be dark-colored and can cast heavy shadows on portions of the light-colored areas in those recesses when the molded articles are trans-illuminated. For example, where the "first shot" is of dark-colored material and is formed to define a recess bounding the outer periphery of an "O," the "island" for the "O" must be held in place by struts; and those struts will be of the same dark-colored material of which the rest of the "first shot" is formed. Consequently, when the light-colored material is disposed in the space defined by the said recess and the said "island," and when a source of illumination is disposed behind the molded article, the struts of the "first shot" can cast heavy shadows on portions of the light-colored area of the indicia. Where the indicia are made in half relief as part of a light-colored "first shot," slots or grooves are usually formed in the face of that "first shot," and those slots or grooves abut the rear portions of the indicia and also open to the front surface of the "first shot," both at points external of the indicia and also within the wholly enclosed areas of the indicia. Those slots or grooves permit the molten material of the "second shot," that will harden to form the dark-colored areas, to pass into and fill the wholly enclosed areas of the indicia; and that material will abut and underlie rear portions of the light-colored areas of the indicia and will, when the article is trans-illuminated, cast a heavy shadow upon those portions of the light-colored areas of the indicia.

The present invention makes it possible to form molded, indicia-bearing articles that have "closed" indicia

2 and that are shadow-free. In doing so, the present invention provides molded, indicia-bearing articles that can be mounted adjacent to, and forwardly of, sources of illumination to provide an improved and pleasing display of the indicia. It is therefore an object of the present invention to provide a process for forming a molded, indicia-bearing article that has "closed" the shadow-free indicia.

In making two of the forms of molded, indicia-bearing articles provided by the present invention, the "first shot" is made with the indicia in half relief and with a recess behind any indicia that is "closed." The recess extends forwardly from the rear surface of the "first shot" to the front surface of that "first shot" and communicates with the area enclosed by the indicia and also communicates with the area immediately external of that indicia. That recess is formed so the material of the "second shot" can enter that recess at a point external of the indicia and can thereafter pass forwardly into the area wholly enclosed by that indicia; and that recess is also formed so the connecting material in that recess can be broken away. As a result, the connecting material of the "second shot" temporarily fills the recess, to facilitate the filling of the wholly enclosed area of the "first shot," and is then broken away to render the light-colored area of the article shadow-free. It is therefore an object of the present invention to provide a molded, indicia-bearing article with a recess behind any "closed" indicia, to fill that recess temporarily with "second shot" material, and subsequently to remove that "second shot" material from that recess.

The recess that extends forwardly from the rear surface of the "first shot" has a relatively large cross section at that rear surface and has a smaller cross section at its forward end. This is desirable because it makes certain that the connecting portion of the "second shot," which temporarily fills that recess, will have its smallest, and therefore its weakest, portion at the inner end of that recess. As a result, the breaking off of the connecting portion of the "second shot" occurs at the forward or inner end of the recess, and thus frees that recess of material that could cast a shadow on the light-colored area of the indicia. It is therefore an object of the present invention to provide a "first shot" with a recess that extends forwardly from the rear surface thereof, and that has its smallest cross section at its forward or inner end.

The core side of the die in which the "second shot" is applied to the "first shot" is provided with a recess that is in register with the recess in the rear surface of the "first shot." The two recesses permit the material of the "second shot" to form an elongated pin-like projection that extends rearwardly from the rear surface of the "first shot." That projection will be held tightly by the recess in the core of the die, and when the two portions of the die are separated and the molded article is separated from the core of the die, the projection will break off at the forward or inner end of the recess in the rear of the "first shot." This arrangement provides automatic and simple severance and removal of the projection from the recess in the rear surface of the "first shot."

In making another form of molded, indicia-bearing article provided by the present invention, the indicia are defined by recesses in a light-colored "first shot," and dark-colored "second shot" material is used to fill those recesses. The "second shot" material is introduced into an elongated groove, in the core of the die, which underlies the recesses and the recess-defining portions of the "first shot"; and that groove guides that material along the rear surface of the "first shot" until that material reaches, enters and fills those recesses. Some of the "second shot" material will remain in the groove and will form a runner that underlies the recess-defining portions of the "first shot," and that runner could cast shadows on those portions of the "first shot." However, that runner will be separated from the finished molded article, and consequently the finished molded article will be shadow-free. It is therefore an object of the present invention to provide a process for forming a light-colored "first shot" with indicia-defining recesses, to apply dark-colored "second shot" material to one surface of the "first shot" to form a runner and to fill the recesses, and then to separate the runner from the finished molded article.

The runner is made quite narrow, so the areas of engagement between that runner and the "first shot" and the "second shot" are small. As a result, the runner can be readily separated from the finished molded article to make that article shadow-free. It is therefore an object of the present invention to form a runner, adjacent a surface of a molded article, that is narrow and that can be separated from that article to make that article shadow-free.

The portions of the "second shot" material that fill the "islands," defined by the "closed" indicia that are formed in half relief on a "first shot," will be subjected to forces that tend to separate them from that "first shot" when the pin-like projection is separated from the recess in that "first shot." Similarly, the portions of the "second shot" material that fill indicia-defining recesses in a "first shot" will be subjected to forces that tend to separate them from that "first shot" when the runner is separated from the finished molded article. The present invention makes it possible for the "second shot" material to resist those forces, as by providing that "second shot" material with aparallel sides. Those aparallel sides coact with complementary aparallel sides of the half relief indicia on the "first shot" or with aparallel sides of the recesses in the "first shot" to provide full resistance to the forces that tend to dislodge the "second shot" material. It is therefore an object of the present invention to form "second shot" material in molded indicia-bearing articles with aparallel sides.

The aparallel sides of the "second shot" material are additionally desirable in preventing the leakage of any light through the joints between the "first shot" and the "second shot" of the finished molded article. Under all normal and anticipated circumstances, the "second shot" material should engage and bond to the "first shot" in such an intimate engagement and bond that no light could escape through the joints between that "first shot" and the "second shot." However, in some exceptional circumstances, the engagement and bond between the "first shot" and the "second shot" may not be as intimate as desired, and light could escape through the joints if the sides of the "second shot" material were parallel to each other and parallel to the path of the light. By making the sides of the "second shot" material aparallel, the present invention prevents the escape of the light.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 1:
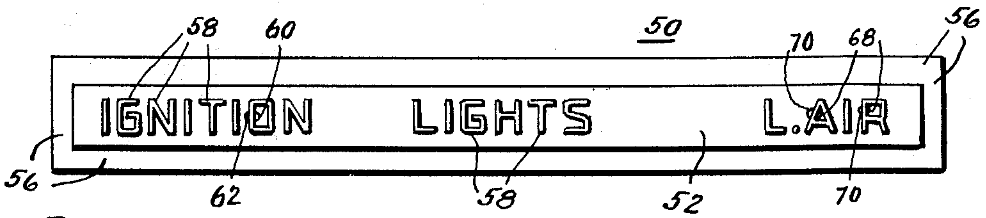
FIG. 1 is a front elevational view of one form of "first shot" for a molded indicia-bearing article.
Figures 2, 3, 4, 5:
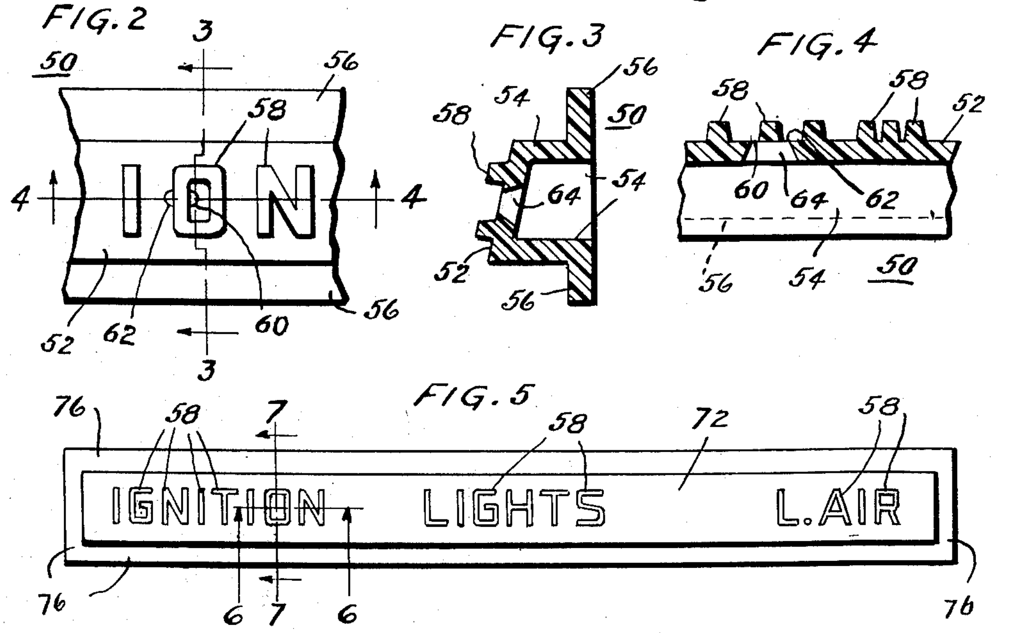
FIG. 2 is an enlarged front elevational view of a portion of the "first shot" shown in FIG. 1.
Figure 6:
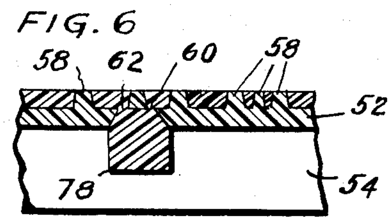
Figure 7:
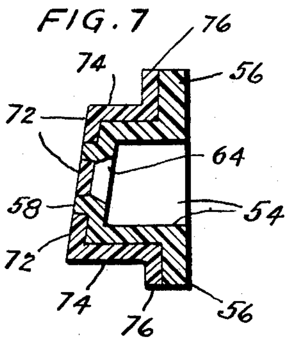
Figure 8:
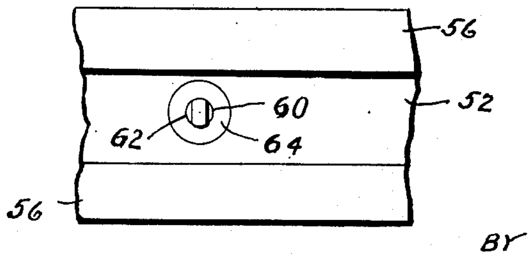
Figure 9:
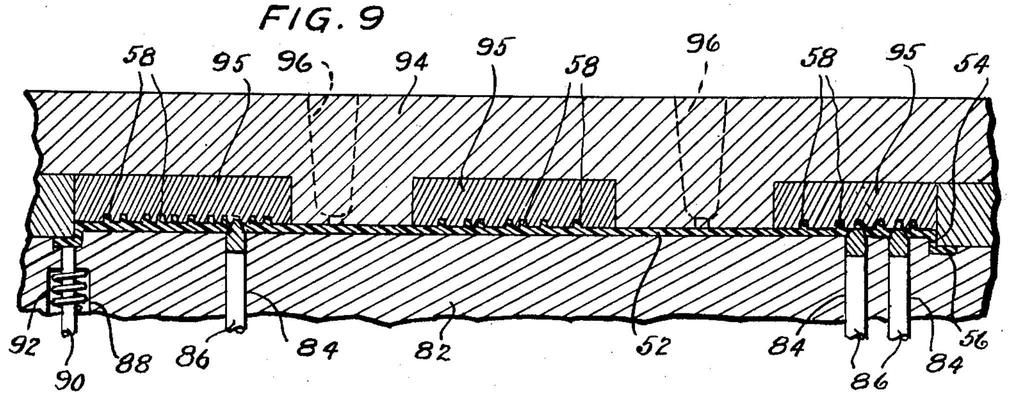
Figure 10:
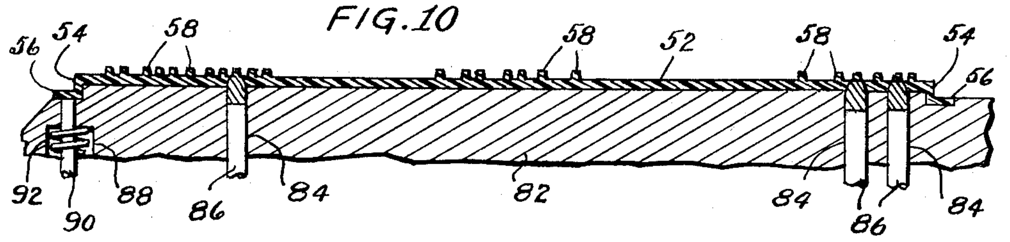
Figure 11:
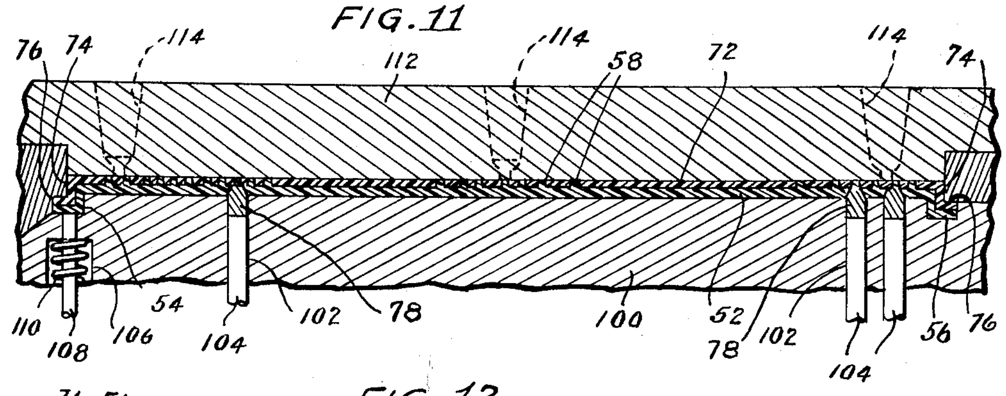
Figure 12:
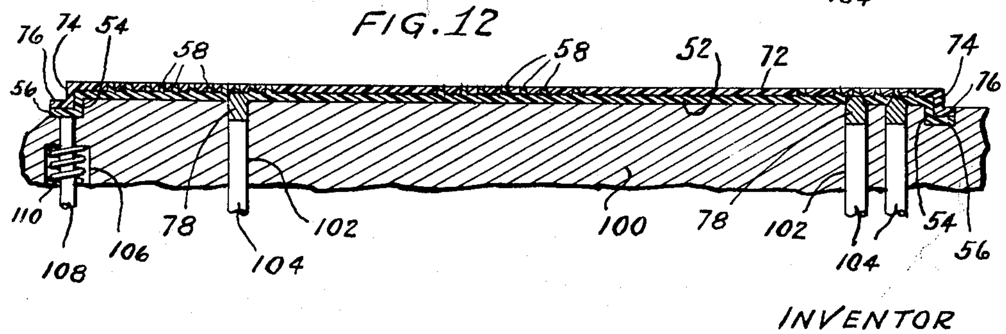
Figure 13:
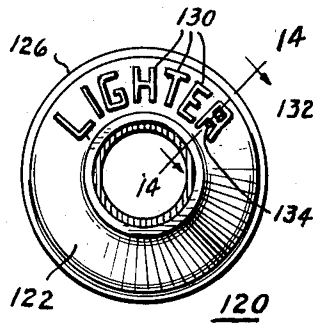
Figure 14:
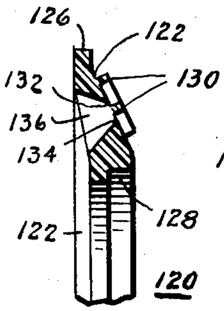
Figure 15:
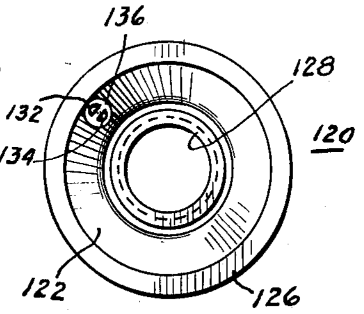
Figure 16:
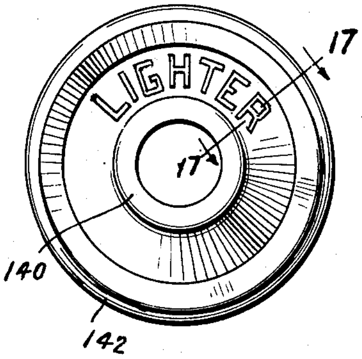
Figure 17:
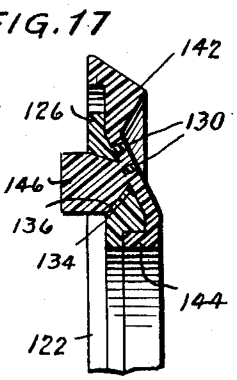
Figure 18:
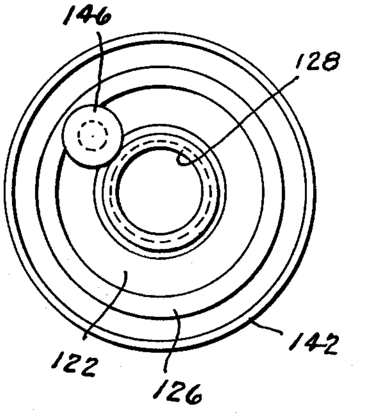
Figure 19:
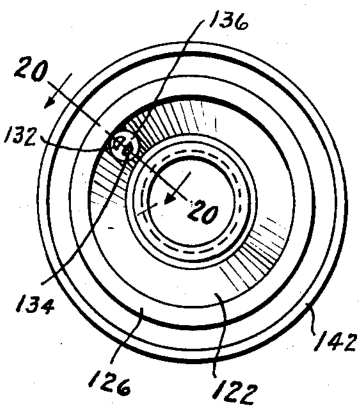
Figure 20:
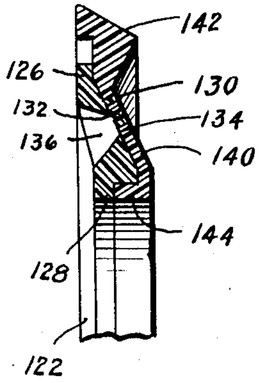
Figure 21:
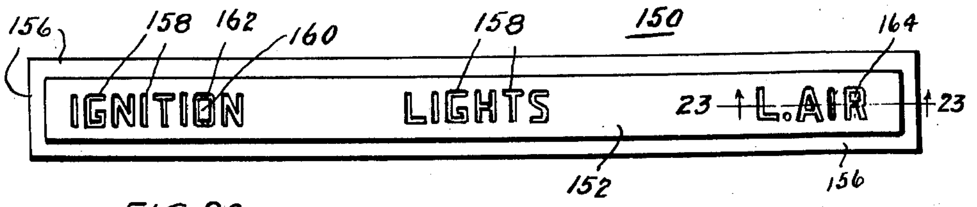
Figure 22:
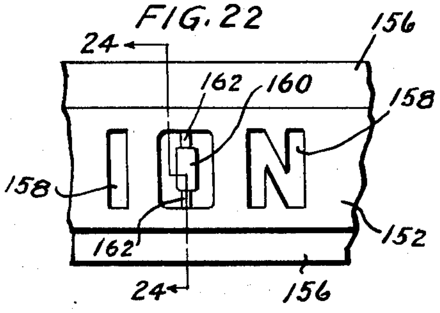
Figure 23:
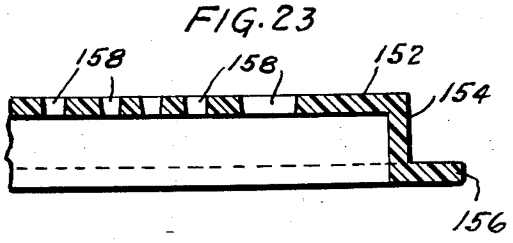
Figure 24:
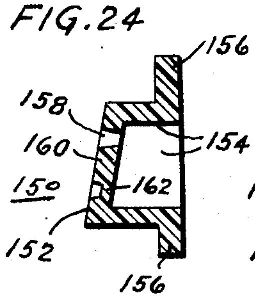
Figure 25:
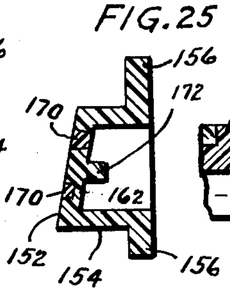
Figure 26:
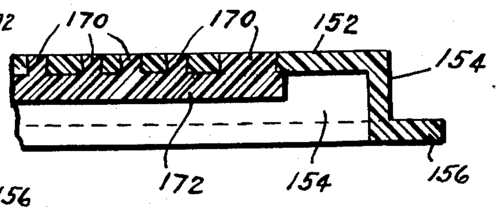
Figure 27:
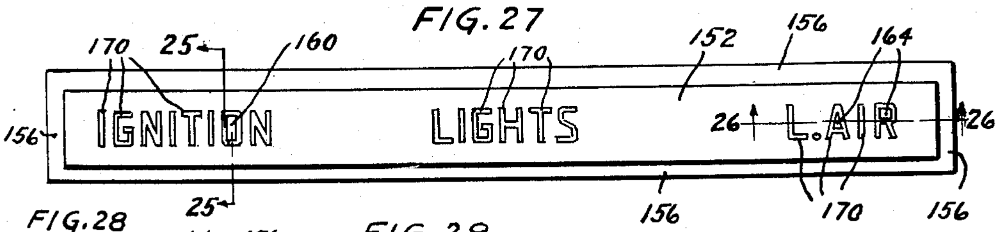

FIG. 3 is a sectional end view of the portion of the "first shot" shown in FIG. 2, and it is taken along the plane indicated by the line 3—3 in FIG. 2, FIG. 4 is an enlarged sectional view of the portion of the "first shot" shown in FIG. 2, and it is taken along the plane indicated by the line 4—4 in FIG. 2, FIG. 5 is a front elevational view of the completed indicia-bearing article which incorporates the "first shot" of FIG. 1, FIG. 6 is an enlarged sectional view of a portion of the article shown in FIG. 5, and it is taken along the plane indicated by the line 6—6 in FIG. 5, FIG. 7 is a sectional end view of the portion shown in FIG. 6, and it is taken along the plane indicated by the line 7—7 in FIG. 5, FIG. 8 is an enlarged rear view of the article shown in FIG. 5, FIG. 9 is a sectional view through the mold which can be used to form the "first shot" of FIG. 1, FIG. 10 is a sectional view through the mold of FIG. 9, and it shows that mold after the cavity portion of that mold has been removed and before the knock-out pins have been actuated to free the "first shot" from the core, FIG. 11 is a sectional view of the mold which can be used to incorporate the "first shot" of FIG. 1 into the completed indicia-bearing article, FIG. 12 is a sectional view of the mold of FIG. 11 after the cavity portion of that mold has been removed and before the knock-out pins have been actuated to free the completed article from the core, FIG. 13 is a front elevational view of another form of "first shot" for a molded indicia-bearing article, FIG. 14 is an enlarged sectional view of a portion of the "first shot" of FIG. 13, and it is taken along the plane indicated by the line 14—14 in FIG. 13, FIG. 15 is a rear elevational view of the "first shot" of FIG. 13, FIG. 16 is a front elevational view of the indicia-bearing article in which the "first shot" of FIG. 13 is incorporated, FIG. 17 is an enlarged sectional view of a portion of the indicia-bearing article of FIG. 16, and it is taken along the plane indicated by the line 17—17 in FIG. 16, FIG. 18 is a rear elevational view of the indicia-bearing article of FIG. 16, FIG. 19 is a rear elevational view of the indicia-bearing article of FIG. 18 after the rearwardly extending projection has been removed from the recess in the rear surface of that article, FIG. 20 is an enlarged sectional view through the completed indicia-bearing article of FIG. 19, and it is taken along the plane indicated by the line 20—20 in FIG. 19, FIG. 21 is a front elevational view of still another form of "first shot" for a molded indicia-bearing article, FIG. 22 is an enlarged front elevational view of a portion of the "first shot" of FIG. 21, FIG. 23 is an enlarged sectional view of another portion of the "first shot" shown in FIG. 21, and it is taken along the plane indicated by the line 23—23 in FIG. 21, FIG. 24 is a sectional end view through the portion of the "first shot" shown in FIG. 22, and it is taken along the broken plane indicated by the line 24—24 in FIG. 22, FIG. 25 is a sectional end view through the indicia-bearing article of FIG. 27 and shows the runner before it is removed, and it is taken along the broken plane indicated by the line 25—25 in FIG. 27, FIG. 26 is a longitudinal section through another portion of the indicia-bearing article of FIG. 27 and shows another runner before it is removed, and it is taken along the plane indicated by the line 26—26 in FIG. 27, FIG. 27 is a front elevational view of the completed indicia-bearing article which incorporates the first shot of FIG. 21.

Figure 28:
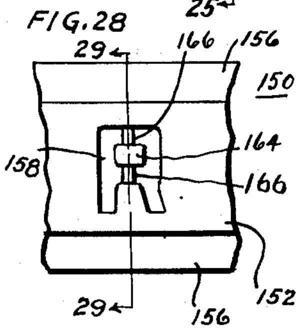
Figure 29:
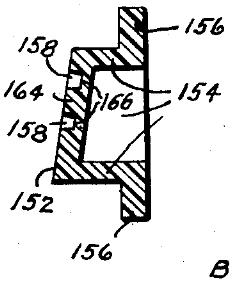
Figure 30:
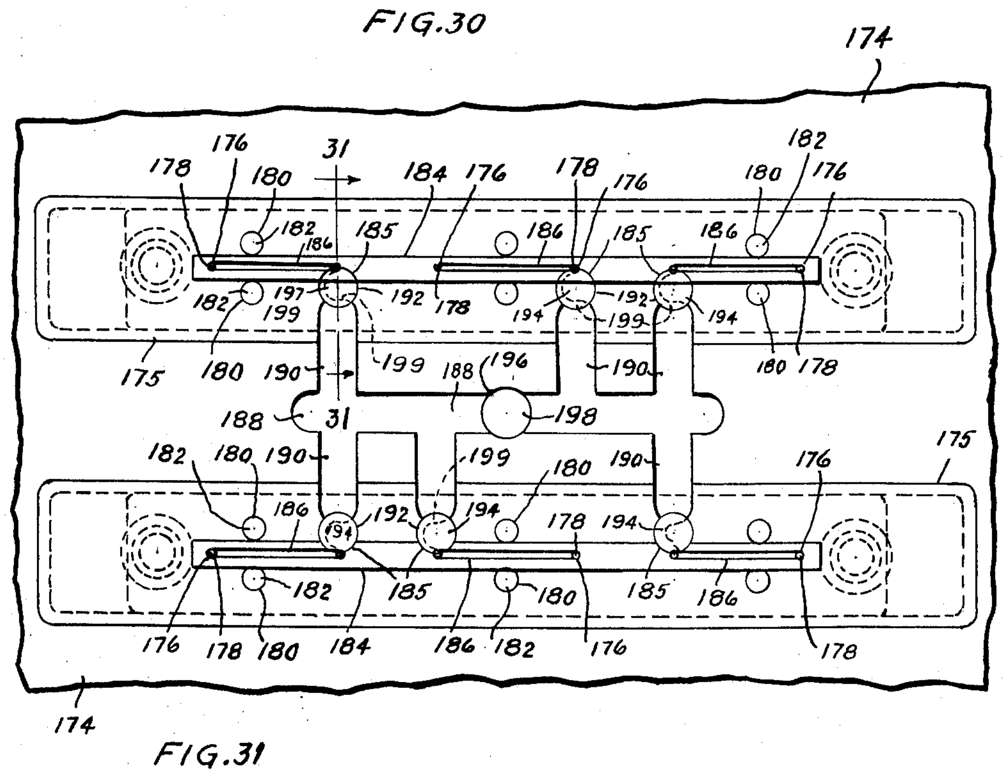
Figure 31:
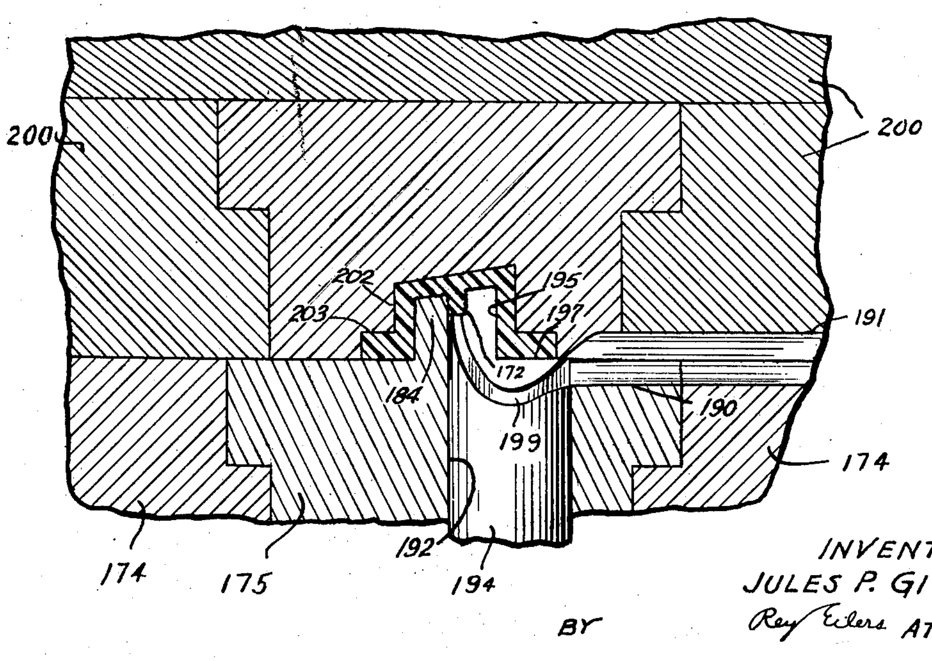
Figure 32:
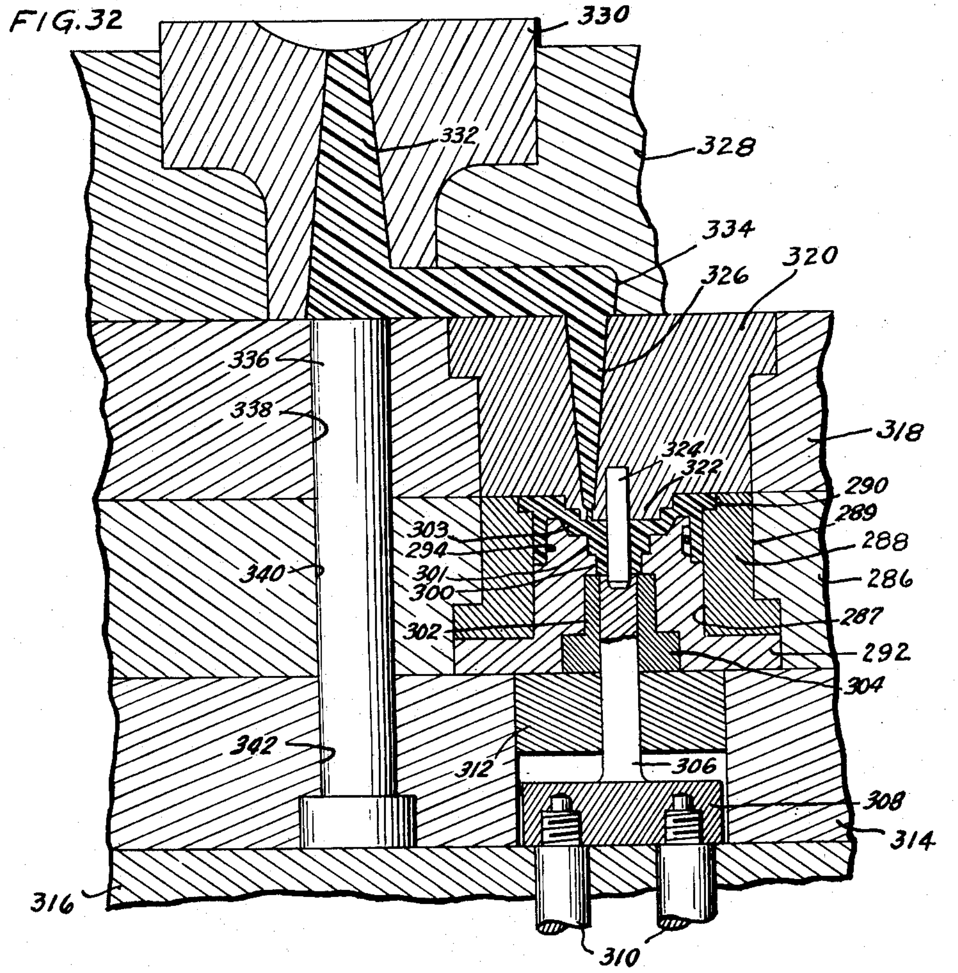
Figure 33:
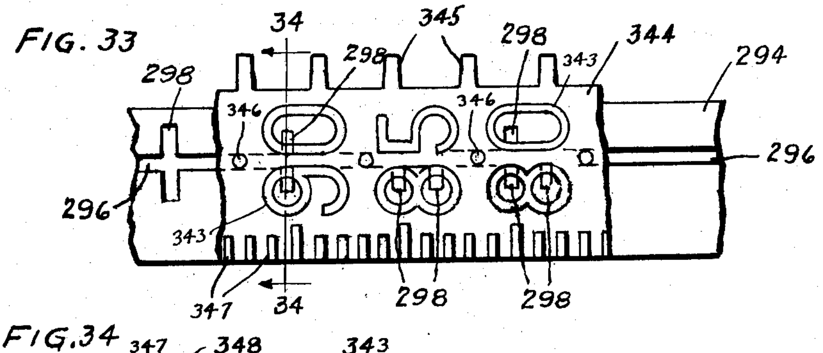
Figure 34:
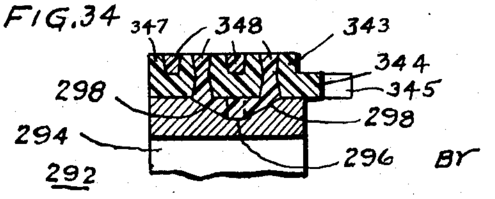
Figure 35:
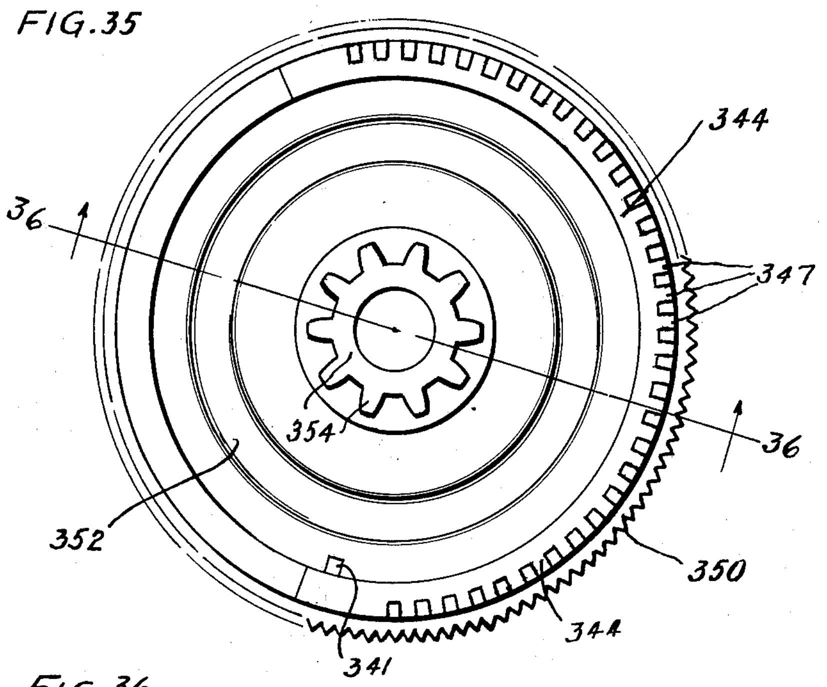
Figure 36:
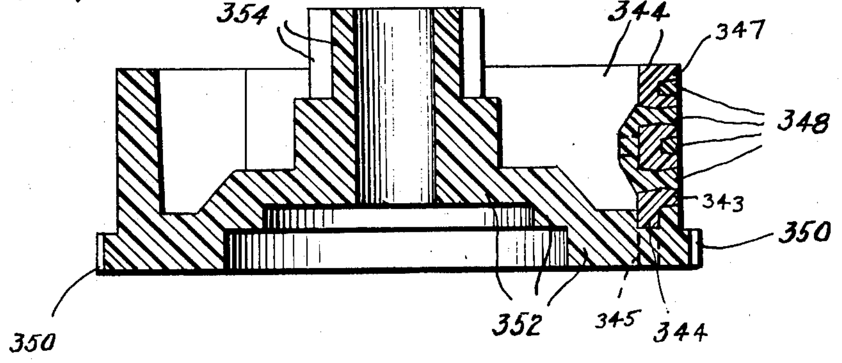

FIG. 28 is an enlarged plan view of a portion of the "first shot" of FIG. 21 which defines a "closed" indicia, FIG. 29 is a sectional view of the portion of the "first shot" shown in FIG. 28, and it is taken along the plane indicated by the line 29—29 in FIG. 28, FIG. 30 is a plan view of the core of the mold which can be used to form the finished article of FIG. 27, FIG. 31 is a sectional view of a portion of the mold which includes the core of FIG. 30, and it is taken along the broken plane indicated by the line 31—31 in FIG. 30, FIG. 32 is a sectional view of a mold which can be used to form an indicia-bearing counterwheel, FIG. 33 is a view, on a greatly enlarged scale, showing a portion of the "first shot" for the counterwheel and showing a portion of the mold of FIG. 32, as that "first shot" and that portion of the mold are developed, FIG. 34 is a sectional view through the portion of the "first shot" and the portion of the mold of FIG. 33, and it is taken along the broken plane indicated by the line 34—34 in FIG. 33, FIG. 35 is a side elevational view of the indicia-bearing counterwheel made by the mold of FIG. 32, and FIG. 36 is a sectional view through the counterwheel of FIG. 35, and it is taken along the plane indicated by the line 36—36 in FIG. 35.

Referring to the drawing in detail, the numeral 50 generally denotes one form of "first shot" for a molded indicia-bearing article that is made in accordance with the principles and teachings of the present invention. That "first shot" will preferably be made of a light-colored plastic material which can be readily molded. The "first shot" 50 includes an elongated face 52 which is generally flat and which is set at an angle, as indicated particularly in FIG. 3. Side walls and end walls 54 extend rearwardly from the elongated face 52; the side walls being generally parallel to each other and the end walls being generally parallel to each other. Flanges 56 project outwardly at right angles from the rear edges of the side walls and end walls 54, and those flanges can underlie the portions of a panel or dashboard which define an opening to accommodate the elongated face of the completed indicia-bearing article. The elongated face 52 of the "first shot" 50 has a number of indicia 58 formed thereon in half relief. In the particular embodiment shown, that indicia spells out the words "IGNITION," "LIGHTS," and "L. AIR."

The numeral 64 denotes a frusto-conical recess which is in the face 52 and which extends forwardly from the rear of the face 52 to the front of that face. That recess underlies part of one side of the "O" formed in half relief on the front of face 52. In extending to the front of the face 52, the recess 64 forms two openings at the front of that face; one of those openings being denoted by the numeral 60 and being located within the "O," and the other opening being denoted by the numeral 62 and being located immediately external of that "O." The smallest diameter portion of the recess 64 is immediately adjacent the front of the face 52, and its largest diameter portion is immediately adjacent the rear of the face. The recess is shown as being frusto-conical, but if desired it could be made frusto-pyramidal, frusto-triangular or the like.

Additional recesses, not shown, are provided in the face 52, and those recesses underlie parts of the "A" and "R." Those additional recesses are similar to the recess 64, and they extend forwardly from the rear of face 52 to the front of that face. In extending to the front of the face 52, the additional recesses form openings 68 corresponding to the opening 60 and form openings 70 corresponding to the opening 62. The openings 68 are in the "closed" areas of the "A" and the "R," and the openings 70 are immediately external of the "A" and the "R." The openings 60 and 62 and the recess 64 place the area bounded and enclosed by the "O" in communication with the area external of the "O." The openings 68 and 70 and the additional recesses, not shown, do the same for the spaces within and external of the "A" and the "R."

The numeral 72 denotes the elongated face of the completed indicia-bearing article which can be formed by applying a "second shot" to the "first shot" 50 of FIG. 1. As indicated particularly by FIG. 7, that "second shot" has rearwardly extending side walls 74 and has outwardly extending flanges 76. The "second shot" also has end walls and, as indicated particularly by FIG. 5, flanges 76 extend outwardly from the end walls as well as from the side walls 74 of the "second shot." Also, as indicated particularly by FIG. 7, the "second shot" overlies the front of the face 52 of the "first shot" 50 and abuts and embeds the exposed side walls of the indicia 58. The material of the "second shot" will preferably be dark-colored and will preferably resist the passage of light through it, thereby high-lighting and emphasizing the indicia 58 formed in half relief on the "first shot" 50.

Part of the "second shot" will fill the "islands" of the "O," the "A" and the "R" and will also form projections 78 that fill, and extend rearwardly from, the recess 60 and the additional recesses; all as shown by FIG. 6. Those projections are removed from the recess 64 and from the additional recesses, as shown by FIGS. 7 and 8.

The numeral 82 denotes the core of a mold in which the "first shot" 50 can be formed, and the cavity of that mold is denoted by the numeral 94. The core 82 has an elongated parallelepiped which can define the rear of face 52 and can define the inner surfaces of side walls and end walls 54. That core also has a perimetral recess adjacent the bottom of that parellelepiped, and that recess defines the rear edges of the side walls and end walls 54 and defines the rear surfaces and outer edges of the flanges 56.

The core 82 has a number of vertically directed passages 84 in it, and those passages accommodate rods 86. Those rods have frusto-conical upper ends, as high-lighted by the sectioning of those upper ends in FIGS. 9 and 10, and those upper ends extend upwardly to the plane of the front of the elongated face 52 of the "first shot" 50 which will be formed in the mold of FIG. 9. The configuration of the frusto-conical upper ends of the rods 86 is exactly complementary to the configuration of the recesses 64 in the face 52.

The cavity 94 of the mold of FIG. 9 has three inserts 95, and those inserts are engraved to form the indicia 58 in half relief. The left-hand-most insert 95 is engraved to form the word "IGNITION," the center insert 95 is engraved to form the word "LIGHTS," and the right-hand-most insert 95 is engraved to form the notation "L. AIR." The cavity 94 also has a number of gates or sprues 96 through which the molten plastic material of the "first shot" is introduced into engagement with flanges 56.

In the formation of the "first shot" 50, the molten plastic material passes through the gates or sprues 96 until it engages the parallelepiped on the core 82 and is forced to move laterally. That plastic material will flow into and fill all parts of the recess defined by the core 82 and by the cavity 94; and in doing so, it will form the flanges 56, the side walls and end walls 54, the face 52 and the indicia 58 of the "first shot." As the plastic material forms the face 52, it will engage the frusto-conical upper ends of the rods 86 and form the recesses 64.

After the "first shot" has been formed and solidified, the cavity 94 is moved away from the "first shot" and from the core 82; and thereafter the ejector pins 90 can be moved upwardly to free the "first shot" 50 from the core 82. The helical compression springs 92, in recesses 88 in the core 82, normally hold the ejector pins 90 in their retracted lower positions, but those springs can yield to permit the pins 90 to be moved upwardly. Those ejector pins are of standard and usual construction, and they are actuated in the ways customarily used in the trade. The ejector pins 90 engage predetermined points on the bottom surfaces of the flanges 56 to strip the "first shot" 50 away from the core 82. At such time, the "first shot" has the appearance indicated by FIG. 1, and it has the recesses 64 emphasized by FIGS. 3 and 4. As indicated above, those recesses extend forwardly to the front of face 52 of "first shot" 50 and form openings 60 and 62 and openings 68 and 70 adjacent portions of the "closed" indicia.

Those openings are arcuate at their outer edges and are straight at their inner edges, all as indicated particularly in FIGS. 1 and 2.

After it is stripped from the core 82, the "first shot" 50 can be assembled with the core 100 of a mold in which that "first shot" is to be incorporated in the completed indicia-bearing article. That core has a parallelepiped and a perimetral recess comparable to the parallelepiped and perimetral recess of the core 82. The core 100 also has recesses 106 to accommodate the helical compression springs 110 for ejector pins 108, and those pins will underlie the flanges 56 of the "first shot." In addition, the core 100 has passages 102 which accommodate ejector pins 104. The ejector pins 104 will be in register with the recesses 64 of the "first shot" 50; and, as indicated particularly by FIGS. 11 and 12, those ejector pins will have their upper ends spaced below the top of the parallelepiped at the upper part of the core 100.

The cavity 112 of the mold of FIG. 11 has gates or sprues 114, and those gates or sprues lead to a smooth surface. That smooth surface will abut the front of the indicia when the core 100 and the cavity 112 are pressed together in a molding machine; and that surface will define the face 72 of the completed indicia-bearing article.

When the molten material of the "second shot" is introduced through the gates or sprues 114, that material will engage the side flanges 56 and move laterally; forming the rearwardly extending side walls 74 and the end walls, forming the flanges 76, and also forming the face 72. In forming the face 72, the molten material of the "second shot" will flow into engagement with and surround the sides of the "open" indicia and will engage and surround the exposed sides of the "closed" indicia. Moreover, that molten material will enter the openings 62 and 70 and thereby pass into the recesses 64. Initially, that molten material will fill the recesses 64 and the portions of passages 102 above the ejection pins 104, and thereafter that material will move upwardly into and fill the "islands" defined by the "closed" indicia. In particular, as indicated by FIG. 6, the molten material of the "second shot" will pass rearwardly through the opening 62 and form the projection 78 that fills the recess 64 and the space above ejection pin 104. Thereafter, the molten material will be forced forwardly through the opening 60 to define the "island" of the "O."

After the "second shot" has solidified, the cavity 112 of the mold is removed. At this time the completed indicia-bearing article will still be in engagement with the core 100, as indicated particularly by FIG. 12. Thereupon, the ejection pins 108 will be moved upwardly to act upon the flanges 56 of the completed indicia-bearing article. As the ejection pins 108 force the completed indicia-bearing article to move upwardly, stress will be applied to the projections 78 and particularly to the small diameter portions, of those projections, adjacent the rear of the face 52. The engagement between the projections 78 and the passages 102 will be quite intimate and will hold those projections in place as the completed indicia-bearing article is stripped away by the ejection pins 108. As a result, the projections 78 will completely separate from the completed indicia-bearing article as that article is stripped away. Subsequently those projections can be ejected from the passages 102 by upward movement of the ejector pins 104.

The overall result is that the recesses 64 which were temporarily filled by the projections 78 will again be cleared, all as indicated by FIGS. 7 and 8. This means that although the recesses 64 were temporarily filled with dark-colored "second shot" material to facilitate the movement of that material into the "islands" of the "closed" indicia, those recesses are cleared of that material. As a result, none of the "second shot" material underlies any part of the indicia, and hence that indicia will be shadow-free when trans-illuminated.

Referring to FIGS. 13–20, the numeral 120 generally denotes a "first shot" of annular form; and that "first shot" is light-transmissive. That "first shot" has a face 122 with a frusto-conical surface at the front thereof and with a frusto-conical surface at the rear thereof. The angle of generation of the frusto-conical rear surface of face 122 is larger than the angle of generation of the frusto-conical front surface of that face. The front and rear surfaces of face 122 coact to provide a generally wedge-shaped cross section for the face 122.

A flange 126 of narrow cross section projects radially outwardly from the periphery of the face 122 of the "first shot" 120, and a shoulder 128 is provided at the inner periphery of the face 122. A number of indicia 130 are formed in half relief on the face 122, and those indicia are both "open" and "closed" indicia. In particular, in the particular embodiment shown by FIGS. 13–15, the indicia spell out the word "LIGHTER," and the "R" of that word has an "island." A recess 136 is formed in the face 122 of the "first shot" 120, and that recess extends forwardly from the rear surface of that face. That recess has a frusto-conical cross section; and its smallest cross section is at the forward surface of the face 122 and is immediately adjacent the rear of the indicia 130. That recess defines two openings 132 and 134; and those openings have arcuate outer edges and have chord-like inner edges. The recess 136 is comparable in configuration and function to the recesses 64 of the "first shot" 50 of FIGS. 1–4; and the openings 132 and 134 are comparable to the openings 60 and 62 of FIGS. 1–4. The "first shot" 120 can be formed in a mold that is generally comparable to the mold shown in FIGS. 9 and 10 and in which the "first shot" 50 could be formed. The recess 136 in the face 122 can be formed by the frusto-conical end of a rod comparable to the rods 86 used in the mold of FIGS. 9 and 10.

Once the "first shot" 122 has been formed and solidified, it can be transferred to a second mold where the "second shot" can be applied to it to form the completed indicia-bearing article. That "second shot" will preferably be light-opaque. That second mold will be somewhat similar to the mold shown in FIGS. 11 and 12, and it will cause the molten material of the "second shot" to engage the face 122 of the "first shot." The molten material of the "second shot" will flow along the face 122 and form a reentrant rim 142, form an inclined face 140, and form a rearwardly extending sleeve-like portion 144. In addition, some of the molten material of the "second shot" will pass rearwardly through the opening 134 and enter the recess 136. That molten material will fill that recess and will also fill a cylindrical recess that is in the core of the mold and is in register with the recess 136, thereby forming a rearwardly extending projection 146; and thereafter it will flow forwardly through the opening 132 and form the "island" defined by the "R." The recess of the mold in which the "second shot" is applied to the "first shot" 120 will be smooth, and hence the face 140 and the reentrant rim 142 of the completed indicia-bearing article will be mold-smooth.

When the cavity of the mold is removed, the completed indicia-bearing article will remain in engagement with the core of that mold. Thereafter, ejection pins, in register with the flange 126 of the "first shot" 120, can be moved to strip the completed indicia-bearing article from the core of the mold. At such time the projection 146 will be held against movement by the core of the mold; and that projection will be pulled out of the recess 136 as the completed indicia-bearing article is stripped away from that core. Thus, while FIGS. 17 and 18 show the projection 146 filling the recess 136, that projection is subsequently removed from that recess to clear that recess, as shown by FIGS. 19 and 20.

The projection 146 engages the sides of the cylindrical recess, that is in register with the recess 136, so intimately that the said projection can resist the forces that tend to pull it out of that recess as the completed indicia-bearing article is stripped away from the core of the mold. The engagement between that projection and that recess is not permanent, however, and a suitable ejection pin, generally similar to the ejection pins 104 of the core 100 in FIGS. 11 and 12, will subsequently separate the projection 146 from the said cylindrical recess in the core of the mold.

In forming the completed indicia-bearing article in this manner, the present invention fills the recess 136 with the projection 146 and subsequently removes that projection. As the completed indicia-bearing article is stripped away from the projection 146 and from the core of the mold, a break will occur in the material of the "second shot" at the smallest cross section of the projection 146. Since that smallest cross section is at the rear of the indicia, all of the "second shot" material underlying the indicia will be removed. Consequently, the indicia will be shadow-free when trans-illuminated.

Referring to FIGS. 21–29, the numeral 150 generally denotes another "first shot" for a molded indicia-bearing articles that is made in accordance with the principles and teachings of the present invention. That "first shot" has an elongated face 152 which is set at an angle, as indicated particularly by FIG. 24. The "first shot" 150 is preferably made of a light-colored material and is light-transmissive. Side walls and end walls 154 extend rearwardly from the face 152, as indicated particularly by FIGS. 23 and 24; and flanges 156 project outwardly from the rear edges of those side walls and end walls, as indicated particularly by FIGS. 23 and 24. Those flanges can underlie the portions of a panel or dashboard which define an opening in which the completed indicia-bearing article can be mounted.

The face 152 has a number of indicia-defining recesses 158 formed therein. In the particular embodiment shown by FIGS. 21–29, those recesses define the word "IGNITION," the word "LIGHTS" and the phrase "L. AIR." Most of the indicia defined by the recesses 158 are "open" indicia, but the "O," the "A" and the "R" are "closed" indicia. The "closed" indicia have "islands" which must be supported; and those "islands" are denoted by the numerals 160 and 164, respectively, and the supports for those "islands" are denoted by the numerals 162 and 166, respectively. The supports 162 and 166 are formed as struts, and those struts are thinner than the face 152, all as indicated by FIGS. 24 and 29.

The "first shot" can be formed in a mold wherein the cavity has engraving that defines the recesses 158. When the material of the "first shot" is introduced into that mold, it will flow into engagement with that engraving and form the indicia-defining recesses 158. That "first shot" will also form the "islands" 160 and 164 and the struts 162 and 166.

After the "first shot" has been formed, it can be placed in a second mold; and the core of that second mold is shown in FIGS. 30 and 31. That core can accommodate two "first shots" 150, but it could be made to accommodate more or fewer "first shots." That core consists of a supporting plate 174 with inserts 175, and each of those inserts has an elongated parallelepiped 184 of trapezoidal cross section on it, all as indicated particularly by FIGS. 30 and 31. Each of the parallelepipeds 184 has three narrow and elongated grooves 186 therein. Each of the parallelepipeds 184 has three passages 176 through it, and those passages are at the ends of, and communicate with, the grooves 186. The passages 176 are disposed at right angles to the plane of the core 174, and they guide and confine ejection pins 178. The upper ends of the ejection pins 178 normally are flush with the bottoms of the grooves 186, but they can be moved upwardly above those bottoms.

The inserts 175 are also provided with passages 180 which accommodate ejection pins 182. Those ejection pins are disposed adjacent the parallelepipeds 184; and their diameters are larger than the diameters of the pins 178. The ejection pins 182 will underlie the flanges 156 of the completed indicia-bearing article and can be moved upwardly to strip the completed indicia-bearing articles from the core 174. A principal gate 188 is provided in the core 174 and that gate receives molten material of the "second shot" from a gate, not shown, in the cavity 200 of the mold. That molten material will flow outwardly from the latter gate and flow parallel to the parallelepipeds 184. Semi-cylindrical recesses 190 and 191, in the core and cavity, respectively, coact to define feeder grooves that extend transversely of, and outwardly from, the principal gate 188. Those feeder grooves extend into proximity to the grooves 186 in those parallelepipeds. Passages 192 are provided in the inserts 175 adjacent the junction of the transversely extending grooves and the grooves 186, and those passages accommodate ejection pins 194. Those passages underlie, and are contiguous with, arcuate notches 185 in the sides of the parallelepipeds 184, and those passages partially underlie and are contiguous with the grooves 186. The pins 194 and larger in diameter than the ejection pins 182, and the ejection pins 182 are larger in diameter than the ejection pins 178. The upper ends of the ejection pins 194 are cut-away, as shown by FIG. 31, to define chord-like surfaces 195 and shoulders 197. The chord-like surfaces 195 will fill out and complete the side walls of the parallelepipeds 184, and the shoulders 197 underlie part of the runner of "second shot" material that will form in the semi-cylindrical groove 191. The upper ends of the ejection pins 194 also have generally helical grooves 199 that extend from the semi-cylindrical grooves 190 to the elongated grooves 186 in the parallelepipeds. A passage 196 underlies and is in communication with the center of the principal gate 188, and that passage accommodates a large diameter ejection pin 198.

The cavity 200 of the mold has elongated prismatic recesses 202 that are trapezoidal in cross section; and those recesses are wider and deeper than the parallepipeds 184. The recesses 202 have perimetral recesses 203 contiguous thereto adjacent the open ends thereof, and the recesses 203 accommodate the flanges 156 on the "first shot" 150. The prismatic recesses 202 in the cavity 200 engage the fronts of the faces 152 of the "first shots" 150 and hold the rear surfaces of the faces 152 solidly in engagement with the parallelepipeds 184.

Molten material for the "second shot" will be introduced into the gate, not shown, of cavity 200, and that material will flow to and enter the principal gate 188 and then flow to the transversely extending feeder grooves 190, 191. Thereafter that material will flow outwardly through those feeder grooves into the helical grooves 199 of pins 194; and those helical grooves will conduct that material to the elongated grooves 186. That material will flow along in the grooves 186 until it fills those grooves and forms runners 172, and it will move upwardly and fill the indicia-defining recesses 158 of the "first shots" 150.

In those instances where the recesses 158 define an "island," the molten material of the "second shot" will flow past the struts 162 or 166, respectively, and overlie those struts, as indicated particularly by FIG. 25. The faces of the prismatic recesses 202 in the cavity 200 of the mold are smooth, and hence the material 170 of the "second shot" will be mold-smooth and will lie in the planes of the faces 152 of the "first shots" 150.

After the "second shots" have solidified, the cavity 200 can be removed; and then the ejector pins 182 can be operated to strip the completed indicia-bearing articles from the parallelepipeds 184. The runners that were formed in the grooves 186 will remain in those grooves as the completed indicia-bearing articles are stripped away by the ejection pins 182. This removes the "second shot" material that underlaid the indicia and the "first shot," and consequently the completed indicia-bearing article will be shadow-free when trans-illuminated.

The runners in the grooves 186 and the solidified "second shot" material in the helical grooves 199, in the feeder grooves 190, 191, in the principal gate 188 and groove 196 are cleared by moving ejection pins 194 and 198 upwardly. The solidified material in the cavity 200 will be cleared as the cavity 200 is separated from the core 174.

As indicated particularly in FIGS. 23–26 and 29, the sides of the indicia-defining recesses 158 are inclined relative to each other and relative to the face 152. The inclined sides of the indicia-defining recesses 158 enable the "second shot" material 170 in those recesses to provide full resistance to forces tending to separate that material from those recesses. The inclination of those sides also helps minimize leakage of light through the joints between the material 170 and the "first shot."

Referring to FIGS. 32–36, the numeral 286 denotes a supporting plate for a mold; that mold being shown in FIG. 32. That supporting plate has a central shouldered recess 289 which receives and holds an insert 288 and an insert 292. That supporting plate also has a passage 340 through it. The insert 288 has a central recess 287, and it also has an annular groove 290 contiguous with the upper end of that central recess. The outer periphery of the groove 290 is provided with a number of axially-directed serrations, and those serrations from a serrated edge on the molded article formed in the mold.

The insert 292 has an intermediate diameter portion that telescopes snugly within the central recess in the insert 288, it has a reduced diameter portion 294 that is above the level of the intermediate diameter portion, and it has a large diameter portion that underlies the insert 288 and that snugly engages the lower portion of the recess 289 in the supporting plate 286. The reduced diameter portion 294 is spaced inwardly from the interior of the recess 287 in insert 288 to define an annular recess in which a cylindrical annulus can be formed. A circumferential groove 296 is formed in the face of the reduced diameter portion 294 of insert 292, and a number of axially-directed grooves 298 are also formed in that face. The grooves 298 are contiguous with and are connected to the circumferential groove 296. The circumferential groove 296 and the axially-directed grooves 298 are shown in detail in FIG. 33 wherein a portion of the face of the reduced diameter portion 294 has been developed.

The numeral 300 denotes an axial recess at the geometric center of the insert 292, and that insert is of relatively small diameter. Disposed above the level of, and contiguous with that axial recess is a larger diameter recess 301 with cylindrical walls. A still larger diameter recess 303 with frusto-conical walls is disposed above the level of, and is contiguous with, the recess 301. Disposed below the level of, and contiguous with, the axial recess 300 is a shouldered recess 302. An insert 304 fits snugly within the shouldered recess 302, and that insert has a centrally located axial passage to accommodate an ejection pin 306. That pin has an axial socket in the upper end thereof and the insert 304 holds that socket concentric with the axial recess 300 of insert 292.

The ejection pin 306 is supported on a movable plate 308, and that plate is moved by reciprocable rods 310. The pin 306 extends through an opening in a back-up plate 312, which underlies part of the insert 292 and which underlies the insert 304. The back-up plate 312 is carried by the back-up plate 314 which underlies part of the insert 292 and also underlies the supporting plate 286. Back-up plate 314 also has a passage 342 through it, and that passage is alined with the passage 340 in supporting plate 286.

Back-up plate 314 is underlain by a back-up plate 316. The latter plate has a pair of spaced passages which accommodate the rods 310 and which permit ready reciprocal movement of those rods relative to that plate.

The plate 286 is overlain by a supporting plate 318 which has a recess to accommodate an insert 320 and which also has a passage 338 that can be alined with the passage 340 in supporting plate 286. The insert 320 has a shouldered die face 322 of circular configuration, and that die face confronts the recesses 300, 301 and 303 of the insert 292. However, that die face is spaced above the lower limits of those recesses to provide a space in which molten plastic material can accumulate and solidify. A pin 324 is seated in insert 320, and it extends downwardly below the bottom of die face 322. That pin is held concentric with the shouldered die face 322 of the insert 320 and will be concentric with the recesses 300, 301 and 303, and it will also be concentric with, and telescope into the socket at the upper end of ejection pin 306. A gate or sprue 326 is also provided in the insert 320, and that gate or sprue opens to the lower surface of the shouldered die face 322 of the insert 320.

A runner plate 328 is disposed above the supporting plate 318 and the insert 320, and the runner plate 328 has an insert 330. An axial passage 332 is provided in the insert 330, and that passage communicates with a runner passage 334 in the plate 328. The runner passage 334, in turn, communicates with the gate or sprue 326. An alining rod 336 telescopes through the passages 338, 340 and 342 of the plates 318, 286 and 314, respectively; and that rod coacts with other alining rods, not shown, to hold the various plates in register. The mold of FIG. 32 can be mounted in a molding machine for plastic materials in a manner well known to those skilled in the art.

The numeral 344 denotes a flexible strip of plastic material that is generally similar to the flexible strip of plastic material shown and described in Joseph A. Gits patent application Serial Number 279,504 which was filed March 21, 1952, for "Molded Articles and Methods of Making Such Articles." The strip 344 has yieldable projections 345 extending from one edge thereof; and those projections can be engaged by the bottom surface of the insert 320 to force the opposite edge of the strip 344 solidly against the shoulder between the reduced diameter portion 294 of insert 292 and the intermediate diameter portion of that insert. The strip 344 has raised indicia formed on it in half relief, and in the particular embodiment shown by FIGS. 32–36, the indicia are numerals. The rear face of strip 344 tapers slightly; the strip being a little thicker adjacent the projections 345 than it is adjacent its opposite edge.

The flexible strip of plastic material in said application has a number of transversely directed elongated openings in it, has a number of rearwardly directed projections at the rear thereof, and has the rear of the areas bounded and defined by the "closed" indicia partially closed. Flexible strip 344, on the other hand, does not have transversely directed openings in it, has just one projection 341 at the rear thereof, and has the rear of the areas bounded and defined by the "closed" indicia completely open. The strip 344 also has interpolative projections 345 at the front thereof, and those interpolative projections are comparable to corresponding projections on the strip of said application. In addition, the strip 344 has a number of small diameter openings 346 extending from the front thereof to the rear thereof.

The strip 344 can be formed in a generally flat mold, and can thereafter be bent, all as taught in said application. Once bent, the strip 344 can be inserted in the annular space between the inner face of the recess 287 in insert 288 and the reduced diameter portion 294 of insert 292. This insertion is made easy and certain by opening the mold at the joint between the supporting plates 286 and 318, because the annular recess defined by the inserts 288 and 292 is thereby rendered fully accessible. As the flexible strip 344 is set in position, the projection 341 thereon will be placed in a complementary recess in the reduced diameter portion 294 of insert 292. The tapering of the strip 344 enables the rear of that strip to engage the reduced diameter portion 294 of insert 292 and wedge the indicia 343 tightly against the interior of surface 287 of insert 288.

Once the strip 344 has been properly inserted, the supporting plates 318 and 286 can be moved into intimate engagement with each other. At this time, the axially directed grooves 298 in the reduced diameter portion 294 of insert 292 will be in register with the open areas bounded and defined by the "closed" indicia of the strip 344, and the openings 346 will be in register with the circumferentially directed groove 296 of the portion 294. The circumferential groove is made less than three hundred and sixty degrees in length to enable the completed molded article to be "peeled off" of the reduced diameter portion 294 of insert 292. The relationship of the open areas bounded and defined by the "closed" indicia to the axially directed passages 298, and the relationship of the openings 346 to the circumferential groove 296 is illustrated by FIG. 33, wherein a portion of the strip 344 is shown overlying part of the reduced diameter portion 294 of insert 292. The relationship of the grooves 298 and the open areas bounded and defined by the "closed" indicia is also shown by FIG. 34. This latter view also emphasizes the fact that the areas bounded and defined by the "closed" indicia have inclined walls that define recesses with their smallest cross sections intermediate the front and rear surfaces of the completed indicia-bearing article.

Once the mold of FIG. 32 has been closed, the "second shot" material can be introduced into the gate 332 and caused to flow to the passage 334. That material will then flow through the sprue 326 into the spaces defined by the insert 292, the insert 288, the pin 324, the insert 320 and the strip 344. The indicia 343 of the strip 344 will tightly and intimately abut the inner face of the recess 287 in the insert 288, because the combined thicknesses of the indicia 343 and of the tapered flexible strip 344 just equal the space between the upper end of the reduced diameter portion 294 of insert 292 and the recess 287 of insert 288. The edge of the strip 344 which has the interpolative projections 347 will intimately engage and abut the shoulder between the reduced diameter portion 294 and the intermediate diameter portion of insert 292, because the insert 320 will be applying downward forces to the projections 345 at the opposite edge of the strip 344 and thus to that strip itself. The interpolative projections 347 will tightly and intimately abut the inner face of the recess 287 in the insert 288, because the combined thicknesses of those projections and of the flexible strip 344 just equal the space between the lower end of the reduced diameter portion 294 of insert 292 and the recess 287 of insert 288.

The projections 345 space the adjacent edge of the strip 344 downwardly from the lower face of the insert 320 and thereby facilitate radial outward movement of the "second shot" material 348 into the recess 290 where it can form a flange with a serrated edge. Other portions of the "second shot" material 348 can pass radially outwardly beyond the projections 345 and then move axially downward to fill the spaces between the interpolative projections 347 and to fill the spaces between the exposed sides of the various indicia 343. Some of the "second shot" material 348 will pass radially inwardly through the openings 346 in the strip 344 and will enter the circumferential groove 296; filling that groove and also passing through the axially directed grooves 298 to enter and fill the open areas bounded and defined by the "closed" indicia. Still other portions of the "second shot" material will form the web 352 of the desired counterwheel and the toothed hub 354 of that counter wheel. After the "second shot" material has solidified, the supporting plate 318 is moved away from the supporting plate 286 and then the rods 310 are forced upwardly to cause the pin 306 to eject the counterwheel. As the rod 306 moves upwardly, it will force the flexible strip 344, now integrally embodied within the molded counterwheel to "peel off" of the reduced diameter portion 294 of insert 292. As that flexible strip 344 and the molded counterwheel move upwardly, the portions of the "second shot" material lying in the circumferential groove 296 and in the axially directed grooves 298 will be sheared away from the flexible strip 344 and from the counterwheel. As a result, there will be no "second shot" material underlying the indicia on the flexible strip 344 of the completed counterwheel.

In one preferred embodiment of the present invention, the flexible strip 344 is made of light-colored plastic material and is light-transmissive, and the "second shot" material is dark in color and is light-opaque. The resultant molded counterwheel provides a desirable contrast in color and thereby highlights and emphasizes the indicia. To further emphasize and highlight the indicia, the rim of the counterwheel can be trans-illuminated by disposing a tiny lamp bulb in the annular recess defined by the rim, the web and the hub of the counterwheel. Light from that lamp will pass outwardly through the indicia of the flexible strip 344; that indicia not being overlain or underlain by the material of the "second shot."

It will be noted from FIGS. 35 and 36 that the flexible strip 344 is not coextensive with the rim of the finished counterwheel. In the particular embodiment shown, the flexible strip 344 extends around the rim of the counterwheel a distance greater than one hundred and eighty degrees but less than two hundred and seventy degrees. This means that a portion of the rim of the counterwheel will be all "second shot," while the rest of the rim will be dominantly "first shot" and only partially "second shot." In the particular embodiment shown, the circumferential groove 296 will be less than two hundred and seventy degrees in length.

Whereas the drawing and accompanying description have shown and described several preferred embodiments of the present invention, it should be apparent to those skilled in the art that various changes may be made in the form of the invention without affecting the scope thereof.

What I claim is:

1. The method of making a molded, indicia-bearing article wherein the indicia are free of shadows when trans-illuminated that comprises forming a "first shot" with a plurality of indicia in relief thereon, at least one of said indicia being a "closed" indicia, said indicia projecting forwardly from a face on said "first shot," forming said "first shot" with a recess that is in register with and is disposed rearwardly of a part of said "closed" indicia which must pass light when said article is trans-illuminated, said recess being frusto-conical in configuration and having its smallest cross section adjacent the rear of said indicia and having its largest cross section disposed rearwardly of and spaced away from said indicia, said recess extending forward to and opening to said face of said "first shot" and opening into the "island" of said "closed" indicia and opening to the space external of said "closed" indicia, whereby said recess places said "island" of said "closed" indicia in communication with said space external of said "closed" indicia, said "first shot" being light-transmissive, applying "second shot" material to said face of said "first shot" to bond to portions of said face external of said indicia and to bond to the exposed sides of said indicia and to fill said recess and thereby pass under said part of said "closed" indicia and to fill said "island" of said "closed" indicia, said "second shot" material that passes under said part of said "closed" indicia underlying and being capable of casting a shadow upon said part of said "closed" indicia and removing the "second shot" material in said recess to render said molded, indicia-bearing article shadow-free, said "second shot" material being light-opaque.

2. The method of making a molded, indicia-bearing article wherein the indicia are free of shadows when trans-illuminated that comprises forming a "first shot" with a plurality of indicia in relief thereon, at least one of said indicia being a "closed" indicia, forming said "first shot" with a recess that is in register with and is disposed rearwardly of a part of said "closed" indicia which must pass light when said article is trans-illuminated, said recess having its smallest cross section adjacent the rear of said indicia, said recess opening into the "island" of said "closed" indicia and opening to the space external of said "closed" indicia, whereby said recess places said "island" of said "closed" indicia in communication with said space external of said "closed" indicia, applying "second shot" material to said "first shot" to fill said space external of said "closed" indicia and to fill said recess and thereby pass under said part of said "closed" indicia and to fill said "island" of said "closed" indicia and removing the "second shot" material in said recess to render said molded, indicia-bearing article shadow-free.

3. The method of making a molded, indicia-bearing article wherein the indicia are free of shadows when trans-illuminated that comprises forming an indicia-defining "first shot" of light-transmissive material, forming said "first shot" so it defines at least one "closed" indicia and so a passage extends rearwardly from the "island" of said "closed" indicia and so a second passage extends rearwardly from the front of said "first shot" at a point exteriorly of said "closed" indicia and so said passages are in communication rearwardly of a part of said "closed" indicia, applying "second shot" material to said "first shot" so as to cause said "second shot" material to enter said second passage and to pass rearwardly and to pass under said part of said "closed" indicia and to enter and to pass forwardly through the first said passage to fill the "island" of said closed" indicia, and subsequently breaking away that portion of said "second shot" material which underlies said part of said "closed" indicia to render said part of said "closed" indicia shadow-free.

4. The method of making a molded, indicia-bearing article that is shadow-free when trans-illuminated and that comprises forming a "first shot" of light-transmissible plastic material with a plurality of indicia-defining recesses therein, disposing said "first shot" in a mold with one face thereof abutting a wall of said mold to keep "second shot" material introduced into said mold from moving into position overlying said face of said "first shot," applying "second shot" material of lesser light-transmissibility to the rear of said "first shot" and confining said "second shot" material within an elongated and narrow area in abutting relation with said rear of said "first shot" by directing said "second shot" material into an elongated narrow groove in said mold that confronts said "first shot" so said "second shot" material flows along in engagement with the rear of the recess-defining portions of said "first shot" and enters and fills said plurality of indicia-defining recesses in said "first shot," the said "second shot" material that underlies the said recess-defining portions of said "first shot" being capable of casting shadows upon the said recess-defining portions of said "first shot" when said article is trans-illuminated, the said "second shot" material that underlies the said recess-defining portions of said "first shot" being narrow and elongated and constituting a runner that can be separated from said "first shot" and from those portions of said "second shot" material that entered and filled said recesses, and separating said runner from said "first shot" and from those portions of said "second shot" material that entered and filled said recesses to render said article shadow-free when trans-illuminated by breaking said runner immediately adjacent said "first shot" and those portions of said "second shot" material that entered and filled said recesses.

5. The method of making a molded, indicia-bearing article that is shadow-free when trans-illuminated and that comprises forming a "first shot" of light-transmissible plastic material with indicia-defining portions, disposing said "first shot" in a mold with said indicia-defining portions thereof abutting a wall of said mold to keep "second shot" material introduced into said mold from moving into position overlying said indicia-defining portions of said "first shot," introducing "second shot" plastic material of lesser light transmissibility into said mold to apply to said "second shot" material to said "first shot" to high-light and emphasize the indicia defined by said indicia-defining portions of said "first shot," keeping said "second shot" material away from the greatest portions of the rear of said indicia-defining portions of said "first shot" and thereby maintaining said greatest portions of the rear of said indicia-defining portions of said "first shot" free of said "second shot" material, permitting a small part of said "second shot" material to underlie part of said indicia-defining portions of said "first shot," said small part of said "second shot" material being narrow and thus readily frangible but being capable of casting a shadow upon said part of said indicia-defining portions of said "first shot" when said article is trans-illuminated, and separating said underlying small part of said "second shot" material from said "first shot" to render said indicia-defining portions of said "first shot" of said molded, indicia-bearing article shadow-free by breaking said small part of said "second shot" material adjacent said rear of said "first shot."

6. The method of making a molded, indicia-bearing, counter-wheel that has the indicia thereof shadow-free when trans-illuminated and that comprises forming an indicia-defining "first shot" of light-transmissible plastic material in the form of a readily bendable flat strip which has portions at the front face thereof that project forwardly to form indicia, forming at least one of said projecting portions so it defines a "closed" indicia, bending said "first shot" until it is arcuate in configuration, disposing said "first shot" in a mold with said projecting portions on its front face abutting a wall of said mold to keep "second shot" material introduced into said mold from moving into position overlying said projecting portions of said "first shot" and to form a space between said wall of said mold and said front face of said "first shot," introducing "second shot" plastic material of lesser light transmissibility into said mold to apply said "second shot" material to said "first shot," causing part of said "second shot" material to pass forwardly from the rear face of said "first shot" to enter and fill the "island" of said "closed" indicia and causing another part of said "second shot" material to pass into said space between said wall of said mold and said front face of said "first shot" to engage and overlie part of said front face of said "first shot," and forming a third part of said "second "shot" material so it is narrow and thus readily frangible and so it underlies said "closed" indicia, said third part of said "second shot" being capable of casting a shadow upon said "closed" indicia when said article is trans-illuminated, and separating said third part of said "second shot" material from said "first shot" by breaking said third part of said "second shot" material adjacent said "first shot" to render said "closed" indicia shadow-free when it is trans-illuminated.

7. The method of making a molded, indicia-bearing article that is shadow-free when trans-illuminated and that comprises forming a "first shot" of light-transmissible plastic material with at least one "closed" indicia and with a recess in said "first shot" that is disposed rearwardly of said "closed" indicia, forming said recess so it communicates with the wholly enclosed area of said "closed" indicia, disposing said "first shot" in a mold with said "closed" indicia abutting a wall of said mold to keep "second shot" material introduced into said mold from moving into position overlying said "closed" indicia, introducing "second shot" plastic material of lesser light transmissibility into said mold to direct said "second shot" material into said recess and into said wholly enclosed area of said "closed" indicia while keeping said "second shot" material from overlying the front of said "closed" indicia, said "second shot" material within said recess being capable of casting a shadow upon said "closed" indicia when said article is trans-illuminated, and removing the said "second shot" material from said recess to keep said "closed" indicia shadow free when said article is trans-illuminated as by breaking said "second shot" material adjacent the rear of said wholly enclosed area of said "closed" indicia.

References Cited in the file of this patent

UNITED STATES PATENTS

| | | |
|---|---|---|
| 2,457,336 | Wilson | Dec. 28, 1948 |
| 2,510,091 | Dofsen | June 6, 1950 |
| 2,544,140 | Dofsen et al. | Mar. 6, 1951 |
| 2,565,803 | Danielson et al. | Aug. 28, 1951 |
| 2,586,978 | Murray | Feb. 26, 1952 |
| 2,587,070 | Spillman | Feb. 26, 1952 |
| 2,781,597 | Doane | Feb. 19, 1957 |

FOREIGN PATENTS

| | | |
|---|---|---|
| 521,056 | Great Britain | May 10, 1940 |